(12) United States Patent
Arunachalam et al.

(10) Patent No.: US 12,086,600 B2
(45) Date of Patent: Sep. 10, 2024

(54) BRANCH TARGET BUFFER WITH SHARED TARGET BITS

(71) Applicant: Microsoft Technology Licensing, LLC, Redmond, WA (US)

(72) Inventors: Somasundaram Arunachalam, Raleigh, NC (US); Daren Eugene Streett, Cary, NC (US); Richard William Doing, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/061,951

(22) Filed: Dec. 5, 2022

(65) Prior Publication Data
US 2024/0184587 A1 Jun. 6, 2024

(51) Int. Cl.
G06F 9/38 (2018.01)
G06F 9/30 (2018.01)
G06F 9/32 (2018.01)

(52) U.S. Cl.
CPC ........ *G06F 9/3844* (2013.01); *G06F 9/30145* (2013.01); *G06F 9/322* (2013.01); *G06F 9/3806* (2013.01)

(58) Field of Classification Search
None
See application file for complete search history.

(56) References Cited

U.S. PATENT DOCUMENTS

| | | | |
|---|---|---|---|
| 5,577,217 A | 11/1996 | Hoyt et al. | |
| 5,850,543 A * | 12/1998 | Shiell | G06F 9/3806 712/E9.05 |
| 6,505,292 B1 | 1/2003 | Witt | |
| 7,873,819 B2 | 1/2011 | Moyer et al. | |
| 8,458,447 B2 * | 6/2013 | Tran | G06F 9/3806 712/238 |
| 10,564,973 B2 | 2/2020 | Hornung et al. | |
| 10,592,248 B2 * | 3/2020 | Havlir | G06F 12/0862 |
| 2004/0230780 A1 | 11/2004 | Prasky et al. | |
| 2009/0177875 A1 * | 7/2009 | Moyer | G06F 9/322 712/E9.055 |
| 2012/0324209 A1 * | 12/2012 | Tran | G06F 9/3806 712/234 |
| 2017/0090935 A1 * | 3/2017 | Falsafi | G06F 12/0875 |
| 2017/0132009 A1 * | 5/2017 | Pota | G06F 9/3806 |

(Continued)

FOREIGN PATENT DOCUMENTS

WO 2002008859 A2 1/2002

OTHER PUBLICATIONS

Kaynak et al., 'Confluence: Unified Instruction Supply for Scale-Out Servers,' copyright 2015, ACM. (Year: 2015).*

(Continued)

*Primary Examiner* — Steven G Snyder
(74) *Attorney, Agent, or Firm* — Fountainhead Law Group, PC

(57) ABSTRACT

Embodiments of the present disclosure include techniques for branch prediction. A branch predictor may be included in a front end of a processor. The branch predictor may store branch targets in a branch target buffer. The branch target buffer includes shared bits, which may be combined with branch target bits to specify branch target destination addresses. Shared bits may result in more efficient memory usage in the processor, for example.

18 Claims, 4 Drawing Sheets

(56) References Cited

U.S. PATENT DOCUMENTS

| | | | |
|---|---|---|---|
| 2018/0060073 A1* | 3/2018 | Havlir | G06F 12/0875 |
| 2018/0121203 A1 | 5/2018 | Ishii et al. | |
| 2018/0246723 A1* | 8/2018 | Prasky | G06F 9/384 |
| 2019/0163902 A1* | 5/2019 | Reid | G06F 12/1009 |
| 2019/0166158 A1* | 5/2019 | Grocutt | G06F 21/53 |
| 2020/0012497 A1* | 1/2020 | Clouqueur | G06F 9/3806 |
| 2021/0004233 A1 | 1/2021 | Kumar et al. | |
| 2022/0197662 A1* | 6/2022 | Soundararajan | G06F 9/3844 |

OTHER PUBLICATIONS

Asheim et al., 'A Storage-Effective BTB Organization for Servers,' 2023 IEEE International Symposium on High-Performance Computer Architecture (HPCA). (Year: 2023).*

Perais et al., 'Branch Target Buffer Organizations,' copyright 2023. (Year: 2023).*

Reinman et al., 'Optimizations Enabled by a Decoupled Front-End Architecture,' IEEE Transactions on Computers, vol. 50, Issue 4, Apr. 2001. (Year: 2001).*

Soundararajan et al., 'PDede: Partitioned, Deduplicated, Delta Branch Target Buffer,' copyright 2021. (Year: 2021).*

Machine Translation of Chinese Patent Application CN 117032802 A, 2023. (Year: 2023).*

International Search Report and Written Opinion received for PCT Application No. PCT/US23/035556, mailed on Feb. 16, 2024, 16 pages.

* cited by examiner

BRANCH TARGET BUFFER WITH SHARED TARGET BITS

BACKGROUND

The present disclosure relates generally to computing, and in particular, to branch prediction buffers with shared target bits.

Modern high-performance processors often deploy a decoupled front-end architecture to improve processor performance. In some processors front-ends, a branch predictor (BP) runs ahead of an instruction fetcher and enqueues instruction fetch addresses into a fetch target queue (FTQ). The branch predictor accesses branch target buffers (BTB) in order to generate fetch address bundles that get captured in FTQ. Front-end performance is mainly dictated by branch prediction throughput and is dependent on how many branches a branch predictor can support per cycle.

To support multiple branches predicted per cycle, branch target buffer (BTB) entries contain information for multiple branches. The higher the number of branches supported, the wider the BTB entry gets. This directly affects area, power, and access time/latency which affects clock frequencies and performance.

DETAILED DESCRIPTION

Described herein are techniques for branch target buffers. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Features and advantages of the present disclosure include a branch target buffer with shared bits. According to various embodiments, shared bits in the branch target buffer may be used in conjunction with bits representing a branch target, which reduces the number of overall bits used in the branch target buffer, thereby reducing memory requirements and improving speed and performance.

Figure 1:
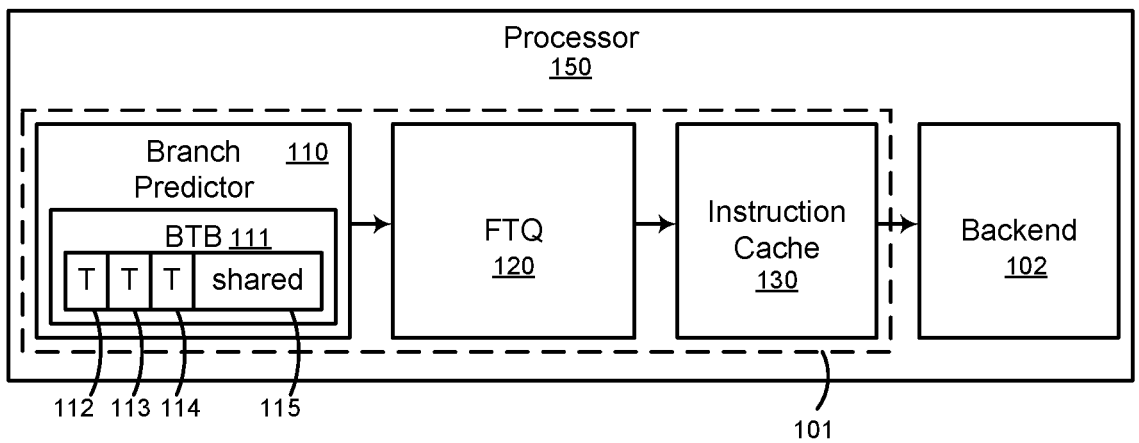
FIG. 1 illustrates a front-end architecture of a processor according to an embodiment.

FIG. 1 illustrates a front-end architecture 101 of a processor 150 according to an embodiment. Processor 150 may include a front end 101 comprising a branch predictor 110, fetch target queue (FTQ) 120, and, in this example, and instruction cache 130. Branch predictor 110 receives and analyzes instructions (e.g., from a program being executed by processor 150) and makes predictions about the outcome of branch instructions cached within the branch target buffer (BTB). Addresses for predicted instructions may be loaded into FTQ 120. The instructions may be retrieved from memory or instruction cache 130 and passed to a backend 102 of processor 150 for execution.

Branch predictor 110 comprises a branch target buffer (BTB) 111 comprising a plurality of branch targets (T) 112-114. Branch targets may comprise comprises a plurality of branch instructions and their attributes, where the attributes include a branch type and a branch target address, for example. BTB 111 may be optimized by including shared bits 115 in the branch target buffer. Shared bits 115 may be used in conjunction with bits of the targets 112-114 to specify addresses of branch target destinations (e.g., an address for a set of instructions being branched to). For example, rather than using a fixed set of bits for each target sufficient to allow a branch to a target destination, fewer bits may be used by the targets and branching may utilize one or more of the shared bits to specify the branch target destination. This is illustrated in more detail in the examples below.

Figure 2:
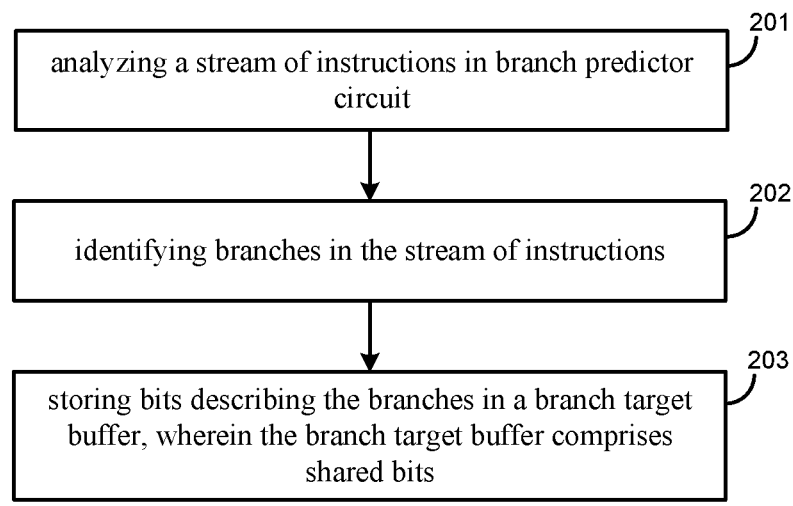
FIG. 2 illustrates a method of predictive branching according to an embodiment.

FIG. 2 illustrates a method of predictive branching according to an embodiment. At 201, a stream of instructions is analyzed in branch predictor circuit. At 202, branches in the stream of instructions are identified. At 203, bits describing the branches are stored in a branch target buffer with bits that are shared between multiple branch targets. These bits may be combined and analyzed to predict the address of the next basic block of instructions. The block of instructions beginning at the starting address of the basic block including the branch instructions and terminated by its maximum size of a taken branch instruction is passed to the FTQ.

Figure 3:
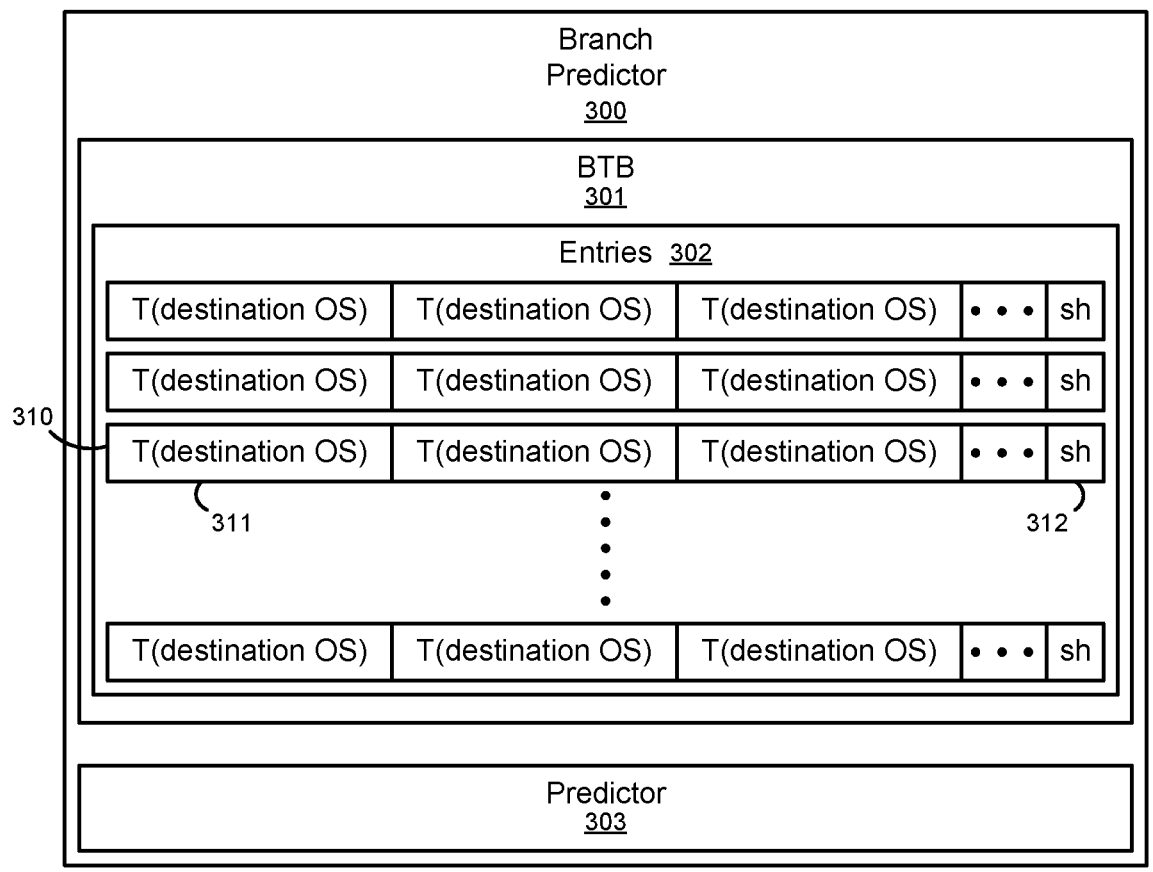
FIG. 3 illustrates an example branch predictor according to an embodiment.

FIG. 3 illustrates an example branch predictor according to an embodiment. Branch predictor 300 includes a predictor circuit block 303 and a branch target buffer (BTB) 301 (e.g., a cache). As mentioned above, branch predictor 300 may receive program instruction addresses and analyze the code for branches. An example branch may be an IF-THEN-ELSE statement, where instructions after the THEN are one branch and instructions after the ELSE are another branch. For example, taking the IF-THEN-ELSE example and making it more concrete, consider the following:

IF (x==y)
THEN (a=a+1)
ELSE (b=b+1)

The above IF-THEN-ELSE may create the following sequence of instructions in the instruction set architecture (ISA):

0x0000 CMP r0, r1
0x0004 B.NE else
0x0008 ADD r2, #1
0x000C B end
else:
0x0010 ADD r3, #1
end:
0x0014

The CMP is a compare instruction that takes as two general purpose register operands (where it is assumed in this example that "x" is in GPR r0 and "y" is in GPR r1). It is located in this example at memory address 0x0000. B.NE is a conditional branch instruction at memory address 0x0004 whose target address is label "else", for which the compiler creates a memory address (0x0010). If the result of the compare instruction was not equal (NE), then the branch will direct execution to its target address; otherwise, execution flows sequentially to the next instruction at memory address 0x0008. If the B.NE is predicted not taken, the ADD is fetched (where in this example it is assumed that "a" is in GPR r2). Following that add is an unconditional branch to the label "end", for which the compiler again creates a memory address (0x0014). The final ADD instruction exists at the memory address associated with label "else" and assumes that "b" is in GPR r3. Accordingly, if the branch predictor predicted the condition as equal (and the conditional branch not taken), then the ADD r3, #1 instruction would be executed; otherwise, the ADD r2, #1 instruction would be executed and the second branch would skip over the ADD r3 instruction. In either case, the end of the sequence of instructions is the memory address associated with the label "end", which would be the next code after the IF-THEN-ELSE construct.

Therefore, the BTB would have information for two branch instructions in that sequence of code. First, the B.NE instruction and second the B instruction. The target of the B.NE is the memory address associated with the label "else" (0x0010) and the target of the "B" instruction is the memory address associated with the label "end" (0x0014).

Those skilled in the art will appreciate that a variety of different branch types exist in different processor instruction set architectures.

Branches are analyzed by a predictor 303. Predictor 303 may analyze branches and produce a likelihood that a branch is taken. Predictor 303 may determine that a branch will be "taken" (e.g., that the instructions at a particular branch target destination are to be executed). When a branch is taken, branch predictor 300 looks up the branch target in BTB 301 and loads the branch target in the FTQ as described above.

In this example, BTB 301 comprises a plurality of entries 302 (e.g., entry 310). The entries 302 comprise a plurality of branch targets (e.g., branch target 311 in entry 310) and a plurality of the shared bits ("sh") (e.g., shared bits 312 in entry 310). In some embodiments, the the entries 302 may have a fixed bit length, including a plurality of branch targets and shared bits, for example. Advantageously, shared bits 312 are used together with one or more of the plurality of branch targets 311 to specify a branch destination address. For instance, each branch target may be used in conjunction with one or more of the shared bits to represent an offset to a branch destination address. Accordingly, a destination address corresponding to a branch target in an entry comprises branch target bits and corresponding bits of the shared bits. For smaller jump branches, fewer bits may be used (e.g., the branch target bits and few or even none of the shared bits), and for larger jumps, the branch target bits and some (or all) of the shared bits may be used. In some cases, different shared bits 312 may be used in conjunction with different branch targets in the particular to specify jumps to branch destination addresses. In some cases, branch targets in entries 302 comprise fixed bit lengths. Using shared bits allows for the use of fewer bits for each of the branch targets, for example.

Figure 4:
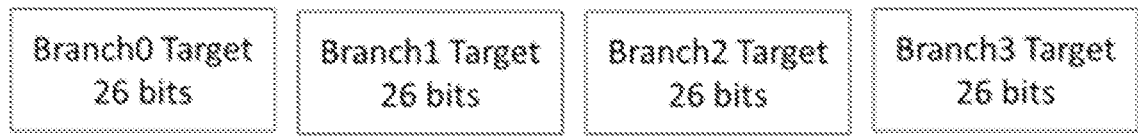
FIG. 4 illustrates traditional branch target bits.

FIG. 4 illustrates traditional branch target bits. Traditionally, branch targets were stored as fixed bit length entries. In this example, each branch target is stored using 26 bits. However, using fixed bits with enough bits to cover all possible destination address jumps may be wasteful as many jumps may not require use of all bits. This wastes memory and may increase lookup times and power consumption, for example.

Figure 5:
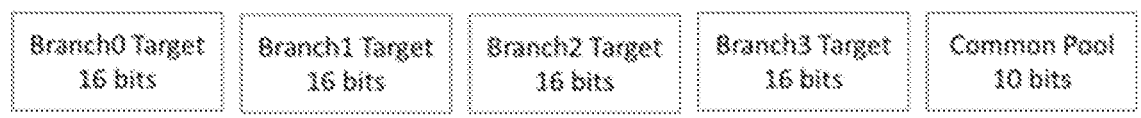
FIG. 5 illustrates branch target bits and shared bits according to an embodiment.

FIG. 5 illustrates branch target bits and shared bits according to an embodiment. In this example, each branch target uses 16 bits. However, fewer branch target bits can be used because any one or more of the 16 bit branch targets may use one or more of 10 shared bits available in a common pool. In some cases, the number of shared bits may be reduced to improve performance. For example, in some embodiments, a combination of the branch target fixed bit lengths (e.g., 16) and the plurality of the shared bits (e.g., 10) are less than a maximum branch offset required to make all branch jumps. In this case, the number of bits support less than maximum program counter (PC) displacement even after the common pool is taken into account. This is referred to as area efficient sharing.

Figure 6:
FIG. 6 illustrates branch target bits and shared bits according to yet another embodiment.

FIG. 6 illustrates branch target bits and shared bits according to yet another embodiment. In this example, more shared bits are used to cover larger branch target jumps. For example, in this embodiment, a combination of the branch target fixed bit lengths (e.g., 16) and the plurality of the shared bits (e.g., 30) are greater than a maximum branch offset. In this case, the number of bits support the full maximum PC displacement even after the common pool is taken into account. This is sometimes referred to as high performance sharing.

Figure 7:
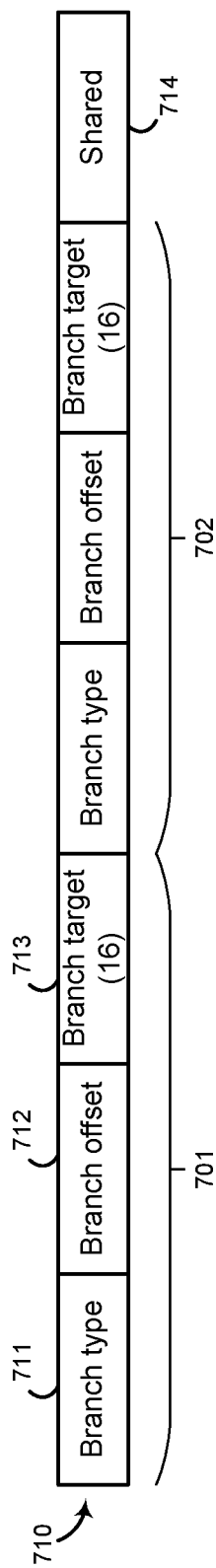
FIG. 7 illustrates branch target buffer entries according to an embodiment.

FIG. 7 illustrates branch target buffer entries with shared bits 714 according to yet another embodiment. In this example, branch targets 701-702 in the one or more entries 710 comprise branch type bits 711, offset bits 712 specifying an address of a branch instruction, and branch target bits 713 specifying an address of a branch destination. Branch types 711 may include direct conditionals, calls, returns, indirects, and direct unconditionals, for example. Branch type field 711 may comprise 4 bits, for example. Branch offset 712 refers to an offset between the branch and the conditional (e.g., an address offset between the address for the conditional instruction and the branch instruction). Branch target 713, as mentioned above, may comprise an address offset, which may be combined with one or more shared bits to jump to the target destination address.

Further Examples

Each of the following non-limiting features in the following examples may stand on its own or may be combined in various permutations or combinations with one or more of the other features in the examples below.

In various embodiments, the present disclosure may be implemented as a system (e.g., in a processor or central processing unit, CPU) or method.

In one embodiment, the present disclosure includes a processor comprising: a front end, the front end comprising: a branch predictor, the branch predictor comprising a branch target buffer comprising a plurality of branch targets; and a fetch target queue; and a processor back end, wherein the branch target buffer comprises shared bits.

In one embodiment, the shared bits are used together with one or more of the plurality of branch targets to specify a branch destination address.

In one embodiment, each branch target and one or more shared bits represent an offset to a branch destination address.

In one embodiment, the branch target buffer comprises a plurality of entries, each entry comprising a first plurality of branch targets and a plurality of the shared bits.

In one embodiment, the plurality of entries have a fixed bit length.

In one embodiment, branch targets in one or more entries comprise fixed bit lengths.

In one embodiment, a combination of the branch target fixed bit lengths and the plurality of the shared bits are less than a maximum branch offset.

In one embodiment, a combination of the branch target fixed bit lengths and the plurality of the shared bits are greater than a maximum branch offset.

In one embodiment, a destination address corresponding to a branch target in the one or more entries comprises a first plurality of branch target bits and one or more corresponding bits of the shared bits.

In one embodiment, the branch targets in the one or more entries comprise type bits, offset bits specifying an address of a branch instruction, and target bits specifying an address of a branch destination.

In another embodiment, the present disclosure includes a method of predictive branching in a processor comprising: analyzing a stream of instructions in branch predictor circuit; identifying branches in the stream of instructions; and storing bits describing the branches in a branch target buffer, wherein the branch target buffer comprises shared bits.

In one embodiment of the method, the shared bits are used together with one or more of the plurality of branch targets to specify a branch destination address.

In one embodiment of the method, each branch target and one or more shared bits represent an offset to a branch destination address.

In one embodiment of the method, the branch target buffer comprises a plurality of entries, each entry comprising a first plurality of branch targets and a plurality of the shared bits. In one embodiment of the method, the plurality of entries have a fixed bit length.

In one embodiment of the method, branch targets in one or more entries comprise fixed bit lengths.

In one embodiment of the method, a combination of the branch target fixed bit lengths and the plurality of the shared bits are less than a maximum branch offset.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A processor comprising:
a front end, the front end comprising:
a branch predictor, the branch predictor comprising a branch target buffer comprising a plurality of branch targets, at least one of the branch targets comprising branch target bits specifying a portion of a branch destination address; and
a fetch target queue; and
a processor back end,
wherein the branch target buffer comprises shared bits, wherein different portions of the shared bits are used together with different branch targets to specify the branch destination address.

2. The processor of claim 1, wherein each branch target and one or more shared bits represent an offset to a branch destination address.

3. The processor of claim 1, wherein the branch target buffer comprises a plurality of entries, each entry comprising a first plurality of branch targets and a plurality of the shared bits.

4. The processor of claim 3, wherein the plurality of entries have a fixed bit length.

5. The processor of claim 4, wherein branch targets in one or more entries comprise fixed bit lengths.

6. The processor of claim 5, wherein a combination of the branch target fixed bit lengths and the plurality of the shared bits are less than a maximum branch offset.

7. The processor of claim 5, wherein a combination of the branch target fixed bit lengths and the plurality of the shared bits are greater than a maximum branch offset.

8. The processor of claim 5, wherein a destination address corresponding to a branch target in the one or more entries comprises a first plurality of branch target bits and one or more corresponding bits of the shared bits.

9. The processor of claim 5, wherein the branch targets in the one or more entries comprise type bits, offset bits specifying an address of a branch instruction, and target bits specifying an address of a branch destination.

10. A method of predictive branching in a processor comprising:
analyzing a stream of instructions in branch predictor circuit;
identifying branches in the stream of instructions; and
storing bits describing the branches in a branch target buffer, the branch target buffer comprising a plurality of branch targets, at least one of the branch targets comprising branch target bits specifying a portion of a branch destination address,
wherein the branch target buffer comprises shared bits, wherein different portions of the shared bits are used together with different branch targets to specify the branch destination address.

11. The method of claim 10, wherein bits describing a particular branch and one or more shared bits represent an offset to a branch destination address.

12. The method of claim 10, wherein the branch target buffer comprises a plurality of entries, each entry comprising a first plurality of branch targets and a plurality of the shared bits.

13. The method of claim 12, wherein the plurality of entries have a fixed bit length.

14. The method of claim 13, wherein branch targets in one or more entries comprise fixed bit lengths.

15. The method of claim 14, wherein a combination of the branch target fixed bit lengths and the plurality of the shared bits are less than a maximum branch offset.

16. The method of claim 14, wherein a combination of the branch target fixed bit lengths and the plurality of the shared bits are greater than a maximum branch offset.

17. The method of claim 14, wherein a destination address corresponding to a branch target in the one or more entries comprises a first plurality of branch target bits and one or more corresponding bits of the shared bits.

18. The method of claim 14, wherein the branch targets in the one or more entries comprise type bits, offset bits specifying an address of a branch instruction, and target bits specifying an address of a branch destination.

* * * * *